(12) United States Patent
SoRelle

(10) Patent No.: US 12,478,052 B2
(45) Date of Patent: Nov. 25, 2025

(54) LIMB LINE POLE WITH ADAPTER

(71) Applicant: Jack Dean SoRelle, Covington, GA (US)

(72) Inventor: Jack Dean SoRelle, Covington, GA (US)

( * ) Notice: Subject to any disclaimer, the term of this patent is extended or adjusted under 35 U.S.C. 154(b) by 143 days.

(21) Appl. No.: 18/532,548

(22) Filed: Dec. 7, 2023

(65) Prior Publication Data
US 2025/0185637 A1    Jun. 12, 2025

(51) Int. Cl.
*A01K 97/10* (2006.01)
*A01K 97/00* (2006.01)
*A01K 97/12* (2006.01)

(52) U.S. Cl.
CPC .............. *A01K 97/10* (2013.01); *A01K 97/00* (2013.01); *A01K 97/12* (2013.01)

(58) Field of Classification Search
CPC ........ A01K 97/00; A01K 97/12; A01K 91/10; A01K 97/10; A01K 97/01
USPC ..... 43/4, 15–17, 21.2, 43.1, 43.11; 248/511, 248/518–520, 534, 535, 538, 539
See application file for complete search history.

(56) References Cited

U.S. PATENT DOCUMENTS

| | | | | |
|---|---|---|---|---|
| 279,556 A * | 6/1883 | Fisher | ................... | A01K 91/10 43/15 |
| 371,777 A * | 10/1887 | Mccabe | ................. | A01K 91/10 242/253 |
| 578,085 A * | 3/1897 | Mell | ...................... | A01K 97/10 43/18.1 R |
| 935,877 A * | 10/1909 | Woesley | .............. | A01K 97/125 43/17 |
| 1,488,838 A * | 4/1924 | Savoie | ................... | A01K 91/10 43/15 |
| 1,516,484 A * | 11/1924 | Meszaros | ............... | A01K 97/12 43/16 |
| 1,716,220 A * | 6/1929 | Ferguson | ............... | A01K 97/10 248/518 |
| 1,719,695 A * | 7/1929 | Ferguson | ............... | A01K 97/10 248/156 |
| 1,800,607 A * | 4/1931 | Decker | ................... | A01K 97/12 43/17 |
| 2,327,273 A * | 8/1943 | Kehrer | .................. | B63B 21/045 24/694 |
| 2,554,927 A * | 5/1951 | Schultz, Jr. | ............ | A01K 97/01 43/16 |
| 2,578,887 A * | 12/1951 | Jackson | ................. | A01K 91/10 D14/230 |
| 2,602,618 A | 7/1952 | Cohen | | |
| 2,650,052 A * | 8/1953 | Bintz | ..................... | A01K 97/01 248/528 |
| 2,684,509 A * | 7/1954 | Couturier | ............... | A01K 97/10 43/17 |

(Continued)

FOREIGN PATENT DOCUMENTS

| | | | | |
|---|---|---|---|---|
| CA | 2668240 A1 | * | 3/2010 | ............. A01K 97/10 |
| KR | 20120077857 A | * | 7/2012 | ............. A01K 97/10 |
| KR | 20180021949 A | * | 3/2018 | ............. A01K 97/10 |

*Primary Examiner* — Darren W Ark
(74) *Attorney, Agent, or Firm* — Jack Dean SoRelle

(57) ABSTRACT

The present disclosure discloses a device having a pole, an adapter assembly, and a fishing line. The pole may include a proximal pole end and a distal pole end. The adapter assembly may be connected to the proximal pole end. The adapter assembly may be configured to attach the pole to a base. The fishing line may be attached to the distal pole end.

3 Claims, 4 Drawing Sheets

(56) References Cited

U.S. PATENT DOCUMENTS

| | | | | |
|---|---|---|---|---|
| 2,803,912 A * | 8/1957 | Kellar | A01K 97/01 | 43/16 |
| 2,869,814 A * | 1/1959 | Hurlimann | A01K 97/10 | 248/431 |
| 2,981,510 A * | 4/1961 | Burns | F21L 17/00 | 248/538 |
| 3,174,249 A | 3/1965 | Louden | | |
| 3,729,849 A * | 5/1973 | Richard | A01K 97/12 | 43/17 |
| 3,879,884 A | 4/1975 | Tucker, Sr. | | |
| 4,587,603 A * | 5/1986 | Hughes | F21V 21/145 | 362/396 |
| 4,620,387 A * | 11/1986 | Bloom | A01K 97/01 | 43/17 |
| 4,763,435 A * | 8/1988 | Deering | A01K 97/10 | 43/21.2 |
| 4,916,850 A | 4/1990 | Dodge | | |
| 4,949,498 A * | 8/1990 | Cecchetti | A01K 97/10 | 248/541 |
| 4,964,233 A * | 10/1990 | Benson | A01K 97/10 | 43/17 |
| 5,083,395 A * | 1/1992 | Daniels | A01K 69/06 | 212/175 |
| 5,312,077 A * | 5/1994 | Gutierrez | A01K 97/10 | 248/214 |
| 5,345,708 A * | 9/1994 | Loyd | A01K 97/10 | 43/21.2 |
| 5,519,959 A * | 5/1996 | Cross | A01K 97/10 | 248/538 |
| 5,533,295 A * | 7/1996 | Hochberger | A01K 97/10 | 248/512 |
| 5,560,137 A * | 10/1996 | Herring | A01K 97/10 | 248/514 |
| 5,564,670 A * | 10/1996 | Dysarz | A01K 97/10 | 248/224.7 |
| 5,662,306 A * | 9/1997 | Dysarz | F16M 13/02 | 248/514 |
| 5,673,507 A * | 10/1997 | Stokes, Jr. | A01K 97/10 | 114/364 |
| 5,699,748 A | 12/1997 | Linskey, Jr. et al. | | |
| 5,799,602 A | 9/1998 | Trillo | | |
| 5,950,348 A | 9/1999 | Gruel | | |
| 6,067,942 A | 5/2000 | Fernandez | | |
| 6,155,191 A * | 12/2000 | Weaver | F16M 11/041 | 114/364 |
| 6,796,078 B1 * | 9/2004 | Bowman | A01K 97/10 | 248/512 |
| 7,520,233 B1 | 4/2009 | Lyon | | |
| D598,689 S * | 8/2009 | McDonald | D6/552 | |
| 7,797,876 B2 * | 9/2010 | McKelvey | A01K 91/10 | 43/43.11 |
| D643,358 S * | 8/2011 | McDonald | D12/407 | |
| 8,276,310 B1 * | 10/2012 | Weber | A01K 97/10 | 43/17 |
| 8,286,572 B1 * | 10/2012 | Picek | A01K 97/10 | 114/364 |
| 8,316,577 B2 * | 11/2012 | Hale | A01K 89/08 | 43/43.11 |
| 8,757,459 B2 * | 6/2014 | Crawford | B63B 17/00 | 224/406 |
| 8,763,550 B1 * | 7/2014 | Matlin | B63B 21/04 | 114/230.25 |
| 9,422,030 B2 * | 8/2016 | Czipri | B63B 17/00 | |
| 9,789,931 B2 | 10/2017 | Czipri | | |
| 9,918,461 B1 * | 3/2018 | Huntsman | A01K 97/11 | |
| 10,206,385 B2 * | 2/2019 | Preller, Jr. | A01K 97/12 | |
| 11,910,790 B1 * | 2/2024 | Sohan | A01K 93/02 | |
| 2002/0139916 A1 * | 10/2002 | Schwebke | A01K 97/08 | 248/534 |
| 2003/0230024 A1 * | 12/2003 | Roberson | A01K 97/10 | 43/21.2 |
| 2007/0186835 A1 | 8/2007 | Follmer | | |
| 2007/0214703 A1 * | 9/2007 | McKelvey | A01K 91/00 | 43/42.72 |
| 2007/0277424 A1 * | 12/2007 | Hale | A01K 89/08 | 43/43.11 |
| 2008/0052981 A1 * | 3/2008 | Richardson | A01K 97/11 | 43/17 |
| 2008/0053361 A1 | 3/2008 | Nicholson | | |
| 2008/0066366 A1 * | 3/2008 | Todd | A01K 97/125 | 43/17 |
| 2013/0000178 A1 * | 1/2013 | Neeley | A01K 87/02 | 43/22 |
| 2013/0333268 A1 * | 12/2013 | Henry, Jr. | A01K 97/10 | 43/4.5 |
| 2013/0333269 A1 * | 12/2013 | Preller, Jr. | A01K 89/08 | 43/17 |
| 2014/0007487 A1 * | 1/2014 | Schwiebert | A45F 3/44 | 114/295 |
| 2014/0053449 A1 * | 2/2014 | Martin | A01K 89/08 | 43/17 |
| 2015/0075416 A1 | 3/2015 | Salt | | |
| 2015/0113854 A1 * | 4/2015 | Coker | A01K 97/00 | 43/54.1 |
| 2020/0288692 A1 * | 9/2020 | Riley | A01K 97/10 | |
| 2020/0390076 A1 * | 12/2020 | Reese | A45F 3/10 | |
| 2022/0097806 A1 * | 3/2022 | Rodehorst | A01K 97/10 | |
| 2022/0394969 A1 * | 12/2022 | Davila | A01K 97/10 | |
| 2025/0120382 A1 * | 4/2025 | Anderson, Jr. | F16M 11/40 | |

\* cited by examiner

LIMB LINE POLE WITH ADAPTER

BACKGROUND

Field

The present disclosure relates to a device having a limb line pole with an adapter.

Description of the Related Art

Typically, fishermen use limb lines to catch catfish on lakes and rivers. Limb lining involves tying one end of a fishing line or rope to a flexible tree limb while the other end is tied to a hook. The hook is baited and lowered into the water.

Most catfish fishermen who want to set up limb lines must take a boat up a river or on a lake to find suitable tree limbs. They then tie the limb lines to these tree branches and bait them. After several hours or early the next morning, they return to check if they have caught any catfish. This process is time-consuming and can be dangerous, especially in the dark. The limb line pole with adapter simulates setting tree limb lines but can be done quickly from a dock or on a boat if desired. This unique solution offers a much easier and safer method for setting up limb lines, significantly reducing the time and effort required.

SUMMARY

The following presents a simplified summary of the present disclosure in a simplified form as a prelude to the more detailed description that is presented herein.

In accordance with embodiments of the disclosure, there is provided a device having a pole and an adapter assembly. The pole may include a proximal pole end and a distal pole end. The adapter assembly may be connected to the proximal pole end. The adapter assembly may be configured to attach the pole to a base. The distal pole end may be attached to a fishing line.

In some aspects, the pole may include a rigid portion and a flexible portion. The rigid portion may include a rigid portion proximal end and a rigid portion distal end. The rigid portion proximal end may be attached to the adapter assembly, and the rigid portion distal end may be attached to a flexible portion proximal end. The flexible portion may be attached to the fishing line via a flexible portion distal end.

In some aspects, the adapter assembly may include a T shaped connector having a first end, a second end, and a third end. A plane of the first end may be parallel to a plane of the third end, and the plane of the first end may be perpendicular to a plane of the second end. The second end of the T shaped connector may be attached to the pole.

In some aspects, the adapter assembly may further include a first elbow connector and a second elbow connector. Each of the first elbow connector and the second elbow connector may include a first elbow end and a second elbow end. The first elbow end may be attached to the T-shaped connector and the second elbow end may be attached to an elongated connector. In some aspects, the elongated connector may include a locking mechanism to lock the adaptor assembly to the base.

The present disclosure discloses a device that facilitates a user in fishing. Specifically, the adapter assembly enables the pole (or a limbline pole) to be attached to a dock cleat or dock post quickly and conveniently.

These and other features, aspects, and advantages of the present disclosure will become better understood with reference to the following description and appended claims.

BRIEF DESCRIPTION OF THE DRAWINGS

Illustrative embodiments of the present disclosure are described herein with reference to the accompanying drawings, in which.

DETAILED DESCRIPTION

Figure 1:
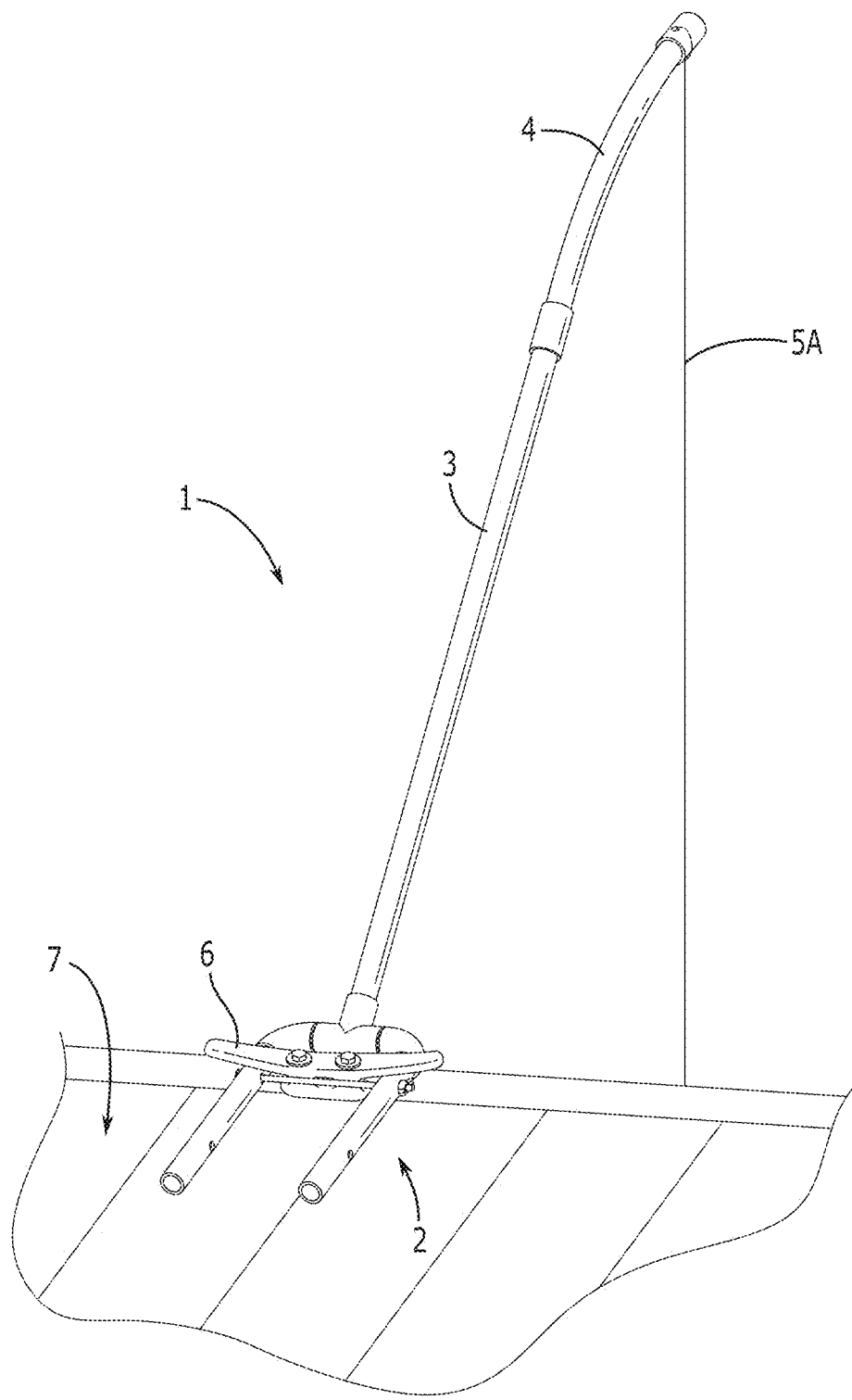
FIG. 1 depicts a front perspective view of a device (a limb line pole with an adapter) in accordance with the present disclosure.

For a further understanding of the nature and function of the embodiments, reference should be made to the following detailed description. Detailed descriptions of the embodiments are provided herein, as well as, the best mode of carrying out and employing the present disclosure. It will be readily appreciated that the embodiments are well adapted to carry out and obtain the ends and features mentioned as well as those inherent herein. It is to be understood, however, that the present disclosure may be embodied in various forms. Therefore, persons of ordinary skill in the art will realize that the following disclosure is illustrative only and not in any way limiting, as the specific details disclosed herein provide a basis for the claims and a representative basis for teaching to employ the present disclosure in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

Fishermen use limb lines, which do not require active monitoring, to catch fish in oceans, lakes, and rivers. Conventional devices for limb lining are difficult to operate, and require time-consuming steps to attach the device to a base. Thus, there exists a need for a device that assists the fishermen to conveniently attach the device to the base.

According to aspects of the present disclosure, a limb-lining device includes a pole and an adapter that allow the device to be attached to a fixed point of a dock, boat, or other structure. The adapter includes an adapter opening that is configured to mate with and be removably coupled to a fixed point on the dock, boat, or other structure, for example, a boat cleat, a dock cleat, a dock support, a boat support, and the like. For example, the adapter opening can be a U-shaped opening that mates with the fixed point. Accordingly, the limb-lining device can be easily and quickly attached to different structures.

The pole of the limb-lining device can include a rigid section and a flexible section. The rigid section can be positioned adjacent to the adapter, and the flexible section can be positioned adjacent to the end of the pole at which a fishing line or other fishing implement is attached. The flexible section is configured to flex, when a fish engages with the fishing line, thereby absorbing a portion of the force exerted by the fish. As such, the flexible section reduced the force on the rigid section and the adapter, thereby reducing the chance the adapter decouples from the fixed point.

Reference will now be made in detail to the present preferred embodiments of the disclosure, examples of which are illustrated in the accompanying drawings. Wherever possible, the same reference numerals are used in the drawings and the description to refer to the same or like parts.

FIG. 1 depicts a front perspective view of a device 1 (a limb line pole with an adapter) in accordance with the present disclosure. FIG. 1 will be explained in conjunction with FIGS. 2-6.

The device 1 may include an adapter assembly 2 that may be configured to attach (specifically removably attach) the device 1 to a base. In some aspects, the base may include a fixed point or structure to which the adapter assembly 2 can be removably coupled, for example, a dock cleat 6 or a dock post 8 (mounted on the deck of a boat 9 or on a dock 7).

Figure 2:
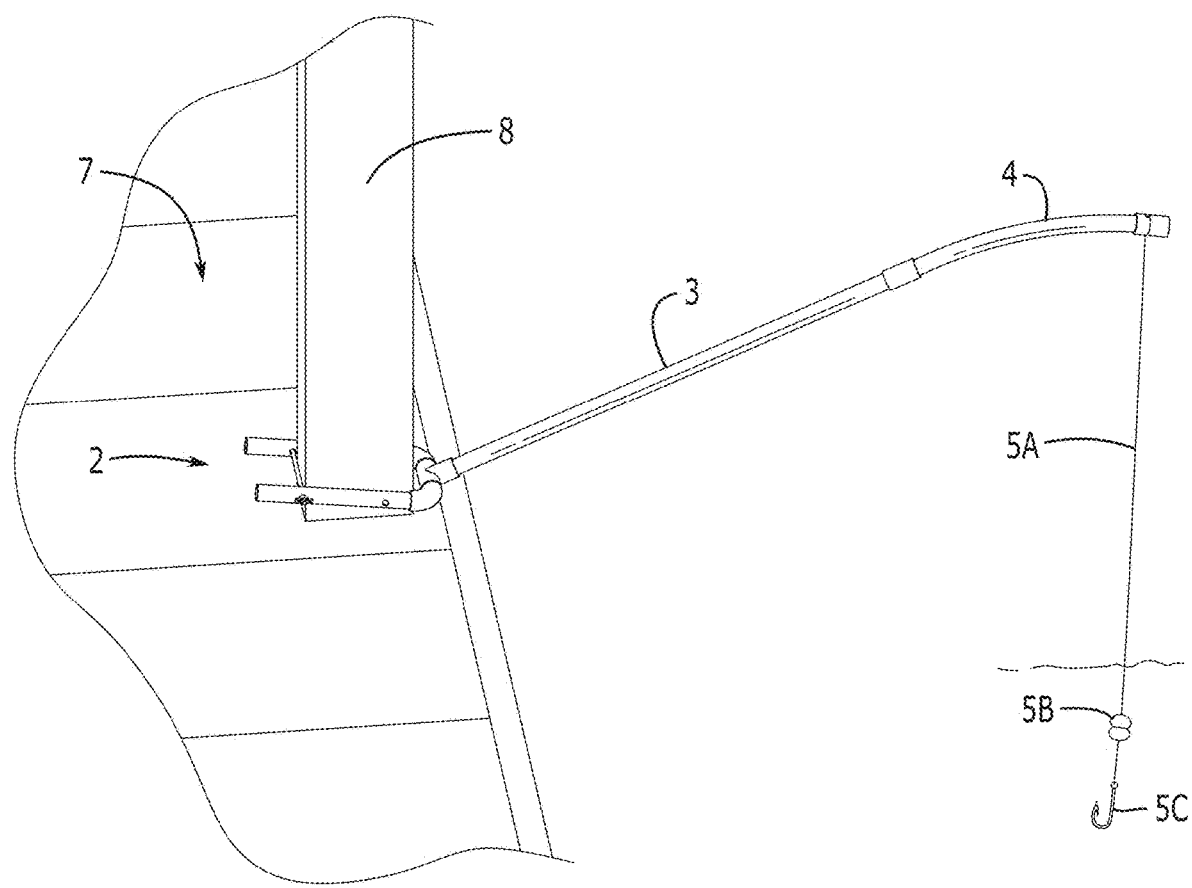
FIG. 2 depicts a side perspective view of the device of FIG. 1 in accordance with the present disclosure.

In some aspects, the device 1 may include a pole having a proximal pole end and a distal pole end. The proximal pole end may be attached to the adapter assembly 2 and the distal pole end may be attached to a fishing line 5A. The fishing line 5A may be connected to one or more fishing implements, for example, a barrel swivel 5B and a fish hook 5C (as depicted in FIG. 2), which may be used for fishing.

The pole may include a rigid portion 3 and a flexible portion 4, which may be connected with each other via a connector. The rigid portion 3 and the flexible portion 4 may be hollow pipes, which may be made of same or different materials. In some aspects, a length of the rigid portion 3 may be same as a length of the flexible portion 4. Alternatively, the length of the rigid portion 3 may be different from the length of the flexible portion 4. For example, the length of the rigid portion 3 may be greater than the length of the flexible portion 4. Alternatively, the length of the rigid portion 3 may be less than the length of the flexible portion 4. In further aspects, a diameter of the rigid portion 3 may be same as a diameter of the flexible portion 4. Alternatively, the diameter of the rigid portion 3 may be different from the diameter of the flexible portion 4.

In some aspects, the rigid portion 3 may include a rigid portion proximal end and a rigid portion distal end. The rigid portion proximal end may be connected to the adapter assembly 2 and the rigid portion distal end may be connected to the flexible portion 4. In further aspects, the flexible portion 4 may include a flexible portion proximal end and a flexible portion distal end. The flexible portion proximal end may be attached to the rigid portion distal end, and the flexible portion distal end may be attached to the fishing line 5A. The flexible portion 4 is configured to flex, when a fish engages with the fishing line 5A, thereby absorbing a portion of the force exerted by the fish. As such, the flexible portion 4 reduced the force on the rigid portion 3 and the adapter assembly 2, thereby reducing the chance the adapter assembly 2 decouples from the for example, a dock cleat 6 or a dock post 8 (mounted on the deck of a boat 9 or on a dock 7).

In further aspects, the adapter assembly 2 may include a T-shaped connector 2B, first and second elbow connectors 2A, and first and second elongated connectors 2D. In some aspects, the dimensions and material of the first elbow connector 2A and the dimensions and material of the second elbow connector 2A may be the same. In further aspects, the dimensions and material of the first elongated connector 2D and the dimensions and material of the first elongated connector 2D may be the same.

In some aspects, the T-shaped connector 2B (e.g., a hollow T-shaped connector) may include a first end, a second end, and a third end. A plane of the first end may be parallel to a plane of the third end, and a plane of the first end may be perpendicular to a plane of the second end. The second end may be configured to receive/attach the pole (e.g., rigid portion proximal end).

In some aspects, the first end of the T-shaped connector 2B may be connected to the first elbow connector 2A, and the third end of the T-shaped connector 2B may be connected to the second elbow connector 2A. Stated another way, the first elbow connector 2A and the second elbow connector 2A may be connected to the first and third edges of the T-shaped connector 2B. In some aspects, each of the first elbow connector 2A and the second elbow connector 2A may include a first elbow end and a second elbow end. The first elbow end of each of the first elbow connector 2A and the second elbow connector 2A may be connected to the T-shaped connector 2B.

In some aspects, the adapter assembly 2 may include first and second short connectors 2C. The first short connector 2C may be configured to connect the T-shaped connector 2B to the first elbow connector 2A, and the second short connector 2C may be configured to connect the T-shaped connector 2B to the second elbow connector 2A. Stated another way, the first short connector 2C may be connected between the T-shaped connector 2B and the first elbow connector 2A, and the second short connector 2C may be connected between the T-shaped connector 2B and the second elbow connector 2A.

In further aspects, the second elbow end of each of the first elbow connector 2A and the second elbow connector 2A may be connected to an elongated connector. For example, the first elbow connector 2A may be connected to a first elongated connector 2D, via the second elbow end of the first elbow connector 2A. Similarly, the second elbow connector 2A may be connected to a second elongated connector 2D, via the second elbow end of the second elbow connector 2A. In some aspects, the first elongated connector 2D and the second elongated connector 2D may be connected to the first elbow connector 2A and the second elbow connector 2A such that there exists a predefined gap between the first elongated connector 2D and the second elongated connector 2D. The gap may be configured to receive the base to facilitate attachment of the device 1 to the base. In some aspects, the first and second elongated connectors 2D may be disposed parallel to each other.

Figure 3:
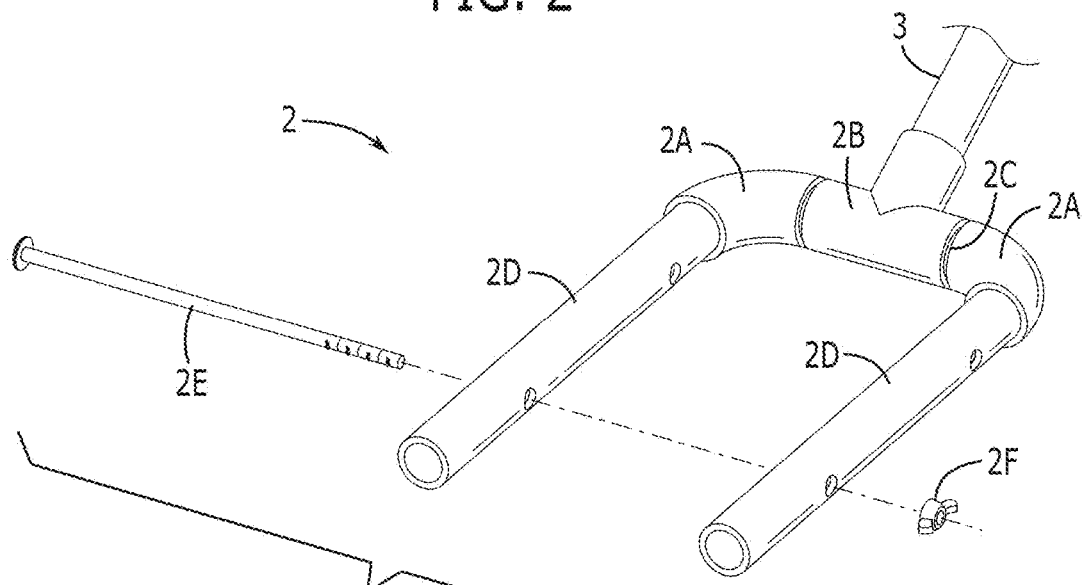
FIG. 3 depicts an exploded perspective view of an adapter assembly in accordance with the present disclosure.
Figure 4:
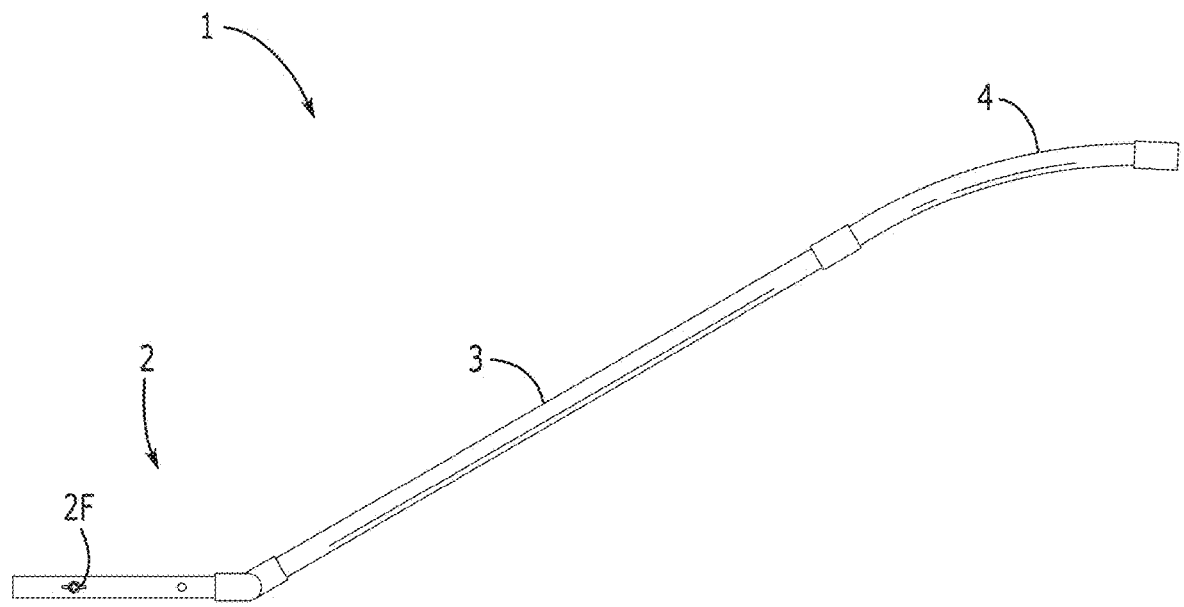
FIG. 4 depicts a side elevation view of the device in accordance with the present disclosure.
Figure 5:
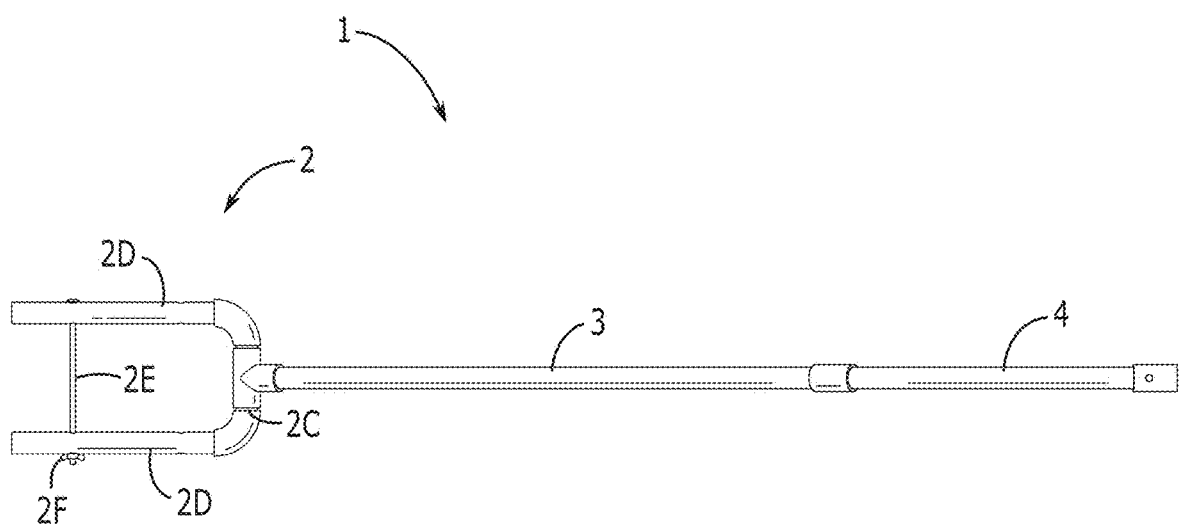
FIG. 5 depicts a top plan view of the device in accordance with the present disclosure.
Figure 6:
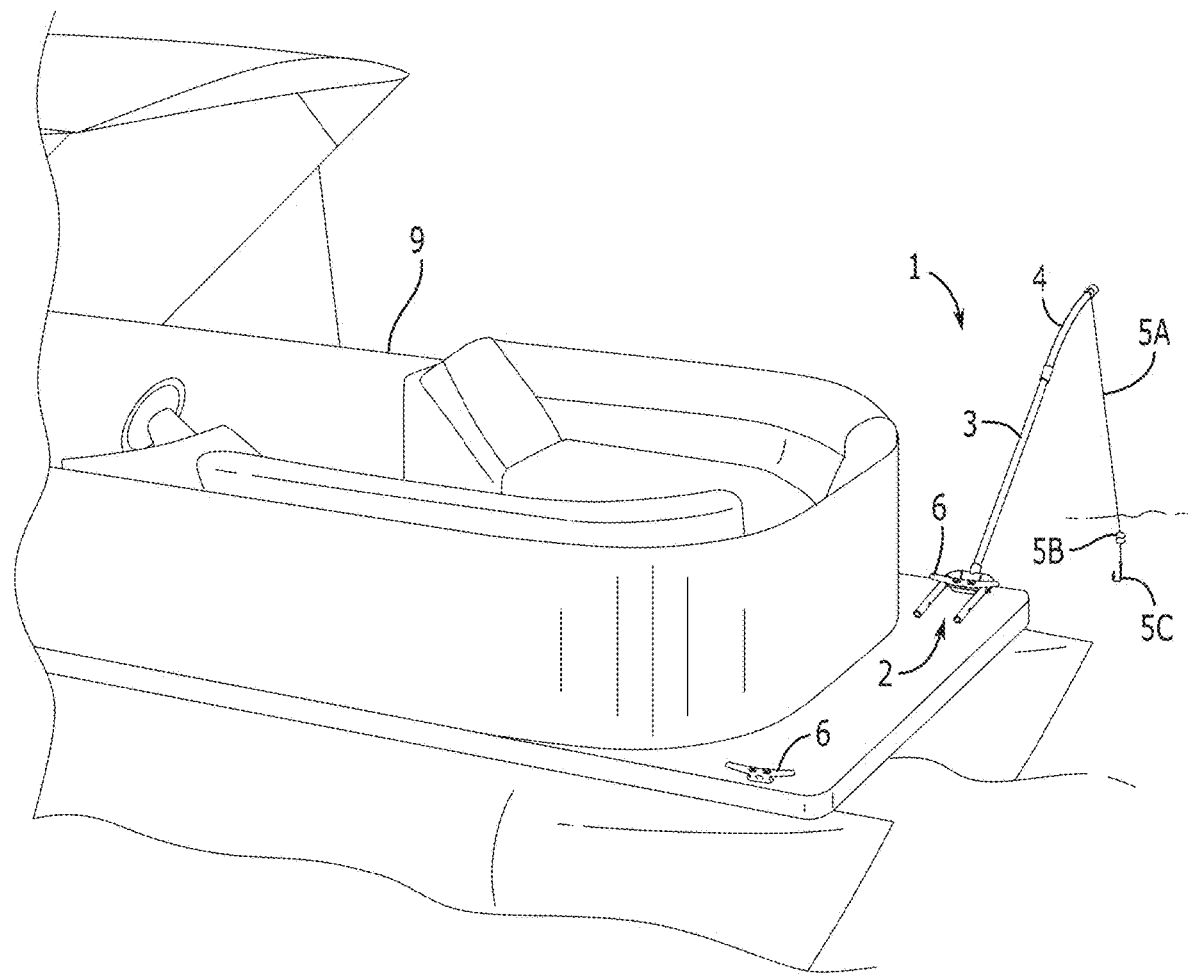
FIG. 6 depicts a side perspective view of the device of FIG. 1 in accordance with the present disclosure.

In some aspects, the first elongated connector 2D and the second elongated connector 2D may include locking mechanism to lock the adapter assembly 2 to the base. For example, each of the first elongated connector 2D and the second elongated connector 2D may include slots to receive a threaded bolt 2E and a wingnut 2F (as shown in FIG. 3), which enables locking of the device 1 to the base.

In operation, a user may slide the device 1 towards the base such that the base is inserted in the gap between the first elongated connector 2D and the second elongated connector 2D. When the base is received between the gap, the device 1 is locked to the base via the locking mechanism described above.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

This disclosure is susceptible to considerable variation within the spirit and scope of the appended claims.

The claimed disclosure is:

1. A limb line pole with adapter device comprising:
   a pole having a proximal pole end and a distal pole end, the pole comprising a rigid portion and a flexible portion, the rigid portion having rigid portion first and second ends, the flexible portion having flexible portion first and second ends, the rigid portion first end comprising the proximal pole end, the flexible portion second end comprising the distal pole end, and the rigid portion second end being attached to the flexible portion first end; and
   an adapter assembly connected to the proximal pole end, wherein the adapter assembly is configured to attach the pole to a base,
   wherein the adapter assembly comprises:

a T-shaped connector having a first end, a second end, and a third end, the first and third ends of the T-shaped connector extending in opposing directions away from the second end of the T-shaped connector, a plane of the first end is parallel to a plane of the third end, the plane of the first end is perpendicular to a plane of the second end, and the second end of the T-shaped connector is attached to the proximal pole end, a first elbow connector which bends along an axis thereof and comprises a first elbow connector first end and a first elbow connector second end, a second elbow connector which bends along an axis thereof and comprises a second elbow connector first end and a second elbow connector second end, a first elongated connector having a first elongated connector first end and a first elongated connector second end, a second elongated connector having a second elongated connector first end and a second elongated connector second end, and a locking mechanism to lock the adapter assembly to the base, the locking mechanism comprising an elongated fastener and a locking fastener, the elongated fastener extending through openings in the first and second elongated connectors, and the locking fastener engaging an end of the elongated fastener to fix the elongated fastener to the first and second elongated connectors, wherein the first elbow connector first end is attached to the first end of the T-shaped connector and the first elbow connector second end both extends in a direction away from the T-shaped connector and is attached to the first elongated connector first end, and the second elbow connector first end is attached to the third end of the T-shaped connector and the second elbow connector second end both extends in the direction away from the T-shaped connector and is attached to the second elongated connector first end, wherein the adapter assembly comprises an adapter opening formed within an area bounded by the T-shaped connector, the first and second elbow connectors, the first and second elongated connectors, and wherein a fishing line is attached to the distal pole end.

2. The device of claim 1, wherein the adapter opening is configured to be mated with a fixed point of the base when the pole is attached to the base.

3. The device of claim 2, wherein the adapter opening is configured to removably couple to the base which comprises one or more of a dock cleat, a boat cleat, a dock support post, or a boat support post.

* * * * *